L. Hedge,
Band Saw Mill.
No. 435. Reissued Mar. 10, 1857.
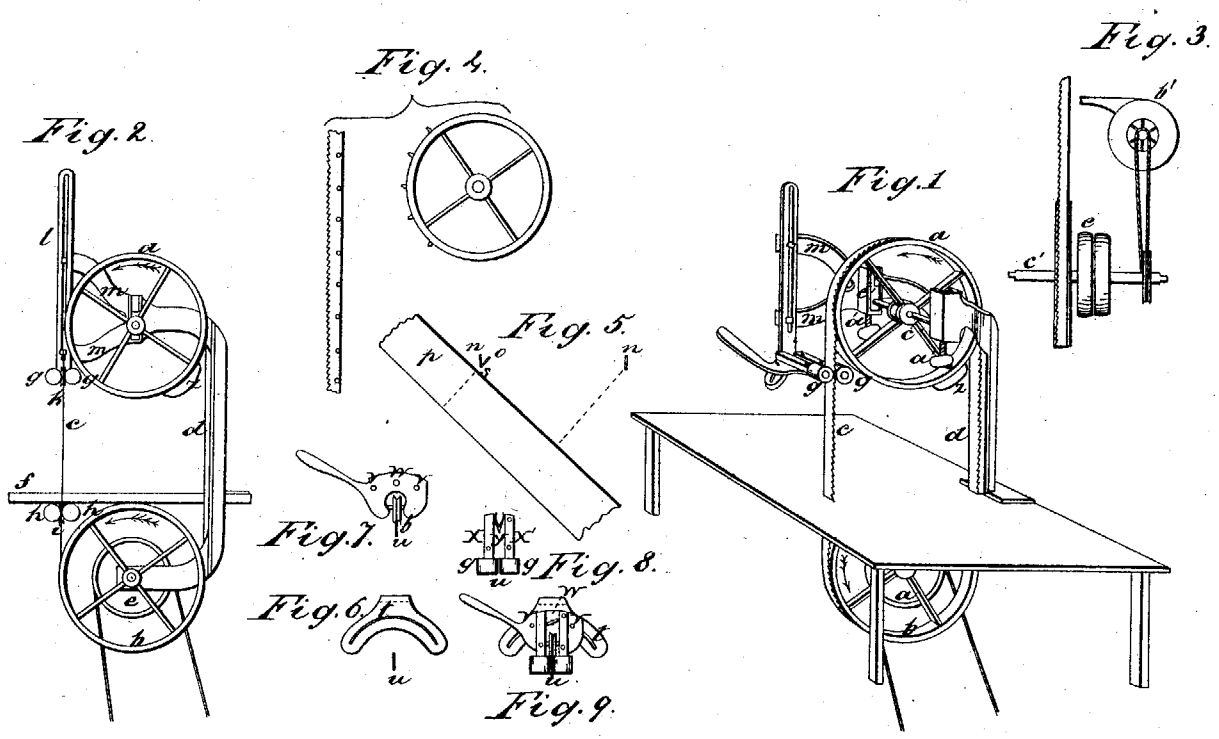
AM. PHOTO-LITHO. CO. N.Y. (OSBORNE'S PROCESS.)

UNITED STATES PATENT OFFICE.

W. P. WOOD AND SAML. DE VAUGHAN, OF WASHINGTON, D. C., ASSIGNEES, BY MESNE ASSIGNMENTS, OF LEMUEL HEDGE.

IMPROVEMENT IN SAW-MILLS.

Specification forming part of Letters Patent No. 6,432, dated May 8, 1849; Reissue No. 435, dated March 10, 1857.

*To all whom it may concern:*

Be it known that LEMUEL HEDGE, (deceased,) of the city, county, and State of New York, did in his lifetime invent certain new and useful improvements in machinery for sawing wood and other material capable of being sawed, (including timber, boards, veneers, inlaying scroll-work, fret-work, &c.,) and for which improvements Letters Patent were granted to the said LEMUEL HEDGE bearing date the 8th day of May, 1849; and we do hereby declare the following to be a full, clear, and exact description of the same, reference being had to the annexed drawings as making a part of this specification, in which similar marks refer to similar parts throughout all the figures.

His invention consists of a saw formed of a plate of steel of suitable length, thickness, and width, with the ends joined together, forming a hoop, with saw-teeth properly formed and set on one edge of the hoop. This hoop is passed around two pulleys or cylinders, *a* and *b*, Figs. 1 and 2, whose axes *c'* revolve in suitable boxes, one of which is seen at *e'*, Fig. 1. These pulleys are separated from each other a distance sufficient to cause the loop to become straightened in the parts *c* and *d*, and sufficiently strained, which may be effected by means of the two screws *a'* and *a'*, Fig. 1. This hoop now becomes an endless saw, and is capable of serving as a belt to communicate motion from one pulley to the other. The face of the pulleys should be at least equal in width with that of the saw, and must be turned parallel with their axes. The two pulleys must revolve in the same plane. If the saw is designed to cut by the downward motion, (which is the most usual and convenient,) the driving-pulley *e* must be fixed to the lower puller, *b*, or to its axis, and if the rotation of the pulleys is in the direction indicated by the arrows *e*, will be the working side of the saw. This arrangement is necessary to insure the good execution of the saw, from the fact that the whole amount of resistance in this case tends to tighten and strain this side *c* of the saw while it proportionally slackens the opposite side, *d*.

Fig. 2 represents an end section of the bench through which the saw passes, and substances resting upon the top of the bench will be acted upon by the saw in its downward motion if presented to its edge.

The small friction-rollers *g g* and *h h*, Fig. 2, are side guides, which serve the double purpose of preventing vibration or shaking in the working portions of the saw, and also to give the right inclination to the edge, in order to cause it to run on the line or in the desired direction. It becomes necessary, for some purposes to which this saw is applicable, to turn the edge outward from its natural position twenty, forty, or more degrees. For instance, in sawing off a board of greater length than the diameter of the main pulleys *a* and *b*, the board would come in contact with the returning side *d* of the saw. This inconvenience is prevented by inclining the edge of the saw outward or the back inward at the working portions of the saw, as is illustrated at Fig. 5, where *n n* are cross-sections of the saw in their natural positions, and *o* in the required inclined position, the edge of the saw S retaining the same point in both cases. In this inclined position of the saw the board *p*, of any width less than the distance *q r*, may be sawed off at right angles without coming in contact with the returning part of the saw at *r*. To effect this inclined position, I construct the mechanism for this purpose as follows: A plate (of metal) shaped like Fig. 6, is attached to the lower end of the slide or buffer *l*, Fig. 1. The dark-shaded segment of a circle, *t*, Fig. 6, represents a slot extending through the plate. The center of this segment is the point *u*, which is coincident with the cutting-edge of the saw. Another plate, Fig. 7, to which the back or feed rollers, *l* or *k*, is attached is placed upon the plate, Fig. 6, so as that the two pins V V may enter into the slot *t* and slide around in it. These two plates are connected together by a screw, the head of which appears at W. This screw passes through the slot *t* into a nut underneath, by means of which the plate, Fig. 7, may be made fast at any point along the slot *t*. The two side rollers, *g g*, and their axles X and X', Fig. 8, are to be placed upon and connected to the plate, Fig. 7, the one, X', permanently, the other, X, by a single pin, on which it may turn, allowing the spring *y* to bear the two rollers *g g* firmly against the sides of the saw.

Fig. 9 is a plan of the several parts of this mechanism when placed together.

It will be perceived that there are two feed or back rollers, *i* and *k*, which turn in a direction reverse to that of the guide-rollers *g g* and *h h*. They are applied to the back of the saw, and may have a V-shaped groove formed on their faces to receive it, and are designed to counteract the force which must necessarily be applied against the edge of the saw in feeding up the work, thus preventing the saw-blade from being forced out of the desired position which is given by the feed-rollers. One of these rollers, *i*, is stationed immediately below the bench or table, while the other, *k*, is attached to the slide or buffer *l*, which admits of being raised or lowered to suit the desired thickness of the material to be sawed. By reference to Fig. 2 it will be readily perceived that a further description will be unnecessary, as the purposes and objects of this improvement are therein clearly shown.

The upper main pulley, *a*, should be made as light as may be, due regard being always had to sufficient strength, as momentum acquired in revolving may in some cases endanger or slacken the working side of the saw. To prevent this, or to insure this side of the saw being always strained, I purpose to apply a brake, *z*, to the upper pulley, to be borne against it by a spring or weight, as convenience may indicate.

Fig. 3 is a sectional elevation showing a mode of giving motion to a blowing apparatus, *b*. This is to be situated so as to blow against the saw immediately beneath the bench, for the purpose of removing the sawdust and prevent its accumulation between the saw and the face of the pulley *b*.

Fig. 4 shows the lower pulley, *b*, armed with spurs projecting from its periphery, and a section of a saw pierced with corresponding holes to receive the spurs. This is designed to prevent the saw from slipping, and is to be used in machines calculated to do work so hard as to require its use.

Having described the invention of the aforesaid LEMUEL HEDGE, what we claim as new, and desire to secure by Letters Patent, is—

1. The means above described to regulate the deflection of the saw-blade when at work—that is to say, the application of the feed-rollers to the back of the saw-blade, for the purposes as herein set forth.

2. The driving-power to the lower pulley, *b*, when the saw is designed to work in its downward motion, substantially as herein set forth.

In testimony whereof we hereunto set our hands this 17th day of February, A. D. 1857.

WILLIAM P. WOOD.
SAML. DE VAUGHAN.

Witnesses:
F. I. MURPHEY,
G. W. MCLANE.